United States Patent [19]

Sumal

[11] Patent Number: 4,554,829
[45] Date of Patent: Nov. 26, 1985

[54] DEVICE FOR MEASURING THE MASS OF A FLOWING MEDIUM
[75] Inventor: Jaihind S. Sumal, Vaihingen-Enz, Fed. Rep. of Germany
[73] Assignee: Robert Bosch GmbH, Stuttgart, Fed. Rep. of Germany
[21] Appl. No.: 626,092
[22] Filed: Jun. 29, 1984
[30] Foreign Application Priority Data
Aug. 10, 1983 [DE] Fed. Rep. of Germany ....... 3328852
[51] Int. Cl.⁴ ................................................. G01F 1/68
[52] U.S. Cl. ........................................ 73/204; 338/25; 338/308; 338/318
[58] Field of Search .................. 73/204; 338/307, 308, 338/309, 318, 25

[56] References Cited
U.S. PATENT DOCUMENTS

| | | | |
|---|---|---|---|
| 2,003,625 | 6/1935 | Boyer | 338/318 X |
| 3,044,901 | 7/1962 | Garnsworthy | 338/308 X |
| 3,244,559 | 4/1966 | Sivertsen | 338/309 X |
| 3,293,587 | 12/1966 | Robinson | 338/313 X |
| 3,900,819 | 8/1975 | Djorup | 73/204 |
| 3,921,119 | 11/1975 | Caddock | 338/309 |

Primary Examiner—Herbert Goldstein
Attorney, Agent, or Firm—Edwin E. Greigg

[57] ABSTRACT

A device for measuring the mass of a flowing medium. The apparatus includes a carrier, to which at least one temperature-dependent resistor layer is applied; on opposing sides this layer is partially overlapped by electrical conductive connecting layers having low electrical resistance and is joined to these layers in an electrically conductive manner. The temperature-dependent resistor layer and the connecting layers are covered with a thin glass layer, except for a respective contact section at each end. Securing sections bent at an angle in the form of claws, each belonging to one electrical connection, are joined in an electrically conductive manner to the contact sections, and the electrical connections are embodied on or joined to holder bodies.

5 Claims, 3 Drawing Figures

DEVICE FOR MEASURING THE MASS OF A FLOWING MEDIUM

BACKGROUND OF THE INVENTION

The invention is based on a device for measuring the mass of a flowing medium, or flow rate meter. Devices of this type are already known which have temperature-dependent resistor layers disposed on a carrier. With such devices, the electrical contact of the temperature-dependent resistor layers and the speed of response of the device to changing flow speeds present continual problems.

OBJECT AND SUMMARY OF THE INVENTION

The device according to the invention has the advantage of a more reliable electrical contact of the temperature-dependent resistor layers, with the highest possible speed of response of the device to changes in the flow speed and the greatest possible resistance to corrosion, so that the device will be assured of a long functional life.

By means of the provisions described herein, advantageous further developments of and improvements are possible. It is particularly advantageous for the electrical contact layers applied to the carrier to be relatively long. It is likewise advantageous to reduce the cross section of the carrier at least partially, in the vicinity of the electrical contact layers, as compared with the cross section of the carrier in the vicinity of the temperature-dependent resistor layer.

The invention will be better understood and further objects and advantages thereof will become more apparent from the ensuing detailed description of preferred embodiments taken in conjunction with the drawings.

DESCRIPTION OF THE EXEMPLARY EMBODIMENTS

Figure 1:
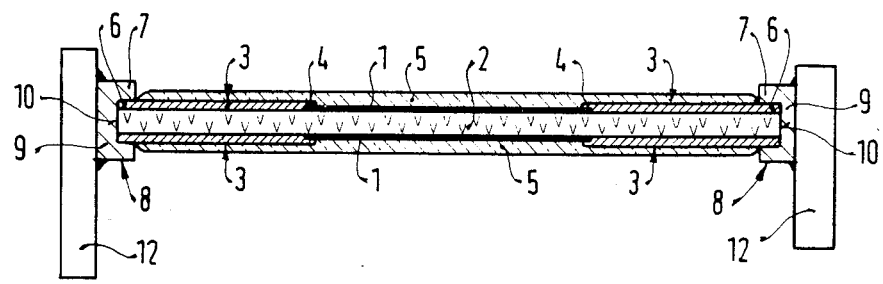
FIG. 1 shows a first exemplary embodiment of a device according to the invention in a side view.

In the device for measuring the mass of a flowing medium, or flow rate meter, shown in FIG. 1, the direction of the flow of the medium is at right angles to the plane of the drawing. The device is disposed by way of example in the intake tube of an internal combustion engine (not shown) and with at least one temperature-dependent resistor 1, which is applied in the form of a film or a layer to a carrier 2, the shape of which is plate-like for example, measures the mass of the air aspirated by the engine. To this end, the temperature-dependent resistor 1 is supplied with current in a known manner by an electronic closed-loop control circuit in such a manner that it assumes a constant temperature.

When such a device is used to measure the mass of air aspirated by an internal combustion engine, very stringent demands are made upon it in terms of the speed and accuracy of measurement and in terms of its functional life, because on the one hand, when the masses of aspirated air are changing rapidly these changes in the air mass must be detected by the device as quickly as possible, for the sake of appropriately adapting the fuel quantity that is to be delivered, and on the other hand the functional life of the device must be at least as long as the service life of the fuel supply system of the engine in which it is installed.

The carrier 2 may for instance comprise a ceramic chip that is approximately 250 $\mu$m thick, 2 mm wide in the direction of flow and approximately 15 mm long transverse to the direction of flow. In order to meet the stringent demands for measuring speed and accuracy, the heat absorption capacity of the carrier 2 and the temperature-dependent resistor 1 is kept as low as possible, and care is furthermore taken that as little heat as possible is drawn off via the carrier 2 and the temperature-dependent resistor 1, resulting in the shortest possible response time to changes in the mass of the flowing medium. Temperature-dependent resistor layers 1 can be disposed on opposite sides of the carrier, extending in the flow direction, and in accordance with the invention they are partially overlapped at the area indicated at 4 by electrical conductive connecting layers 3 applied to the carrier 2 and disposed on opposite sides of the temperature-dependent resistor layer 1, thereby effecting an electrically conductive connection. The electrically conducting connecting layers 3 have a low electrical resistance, so that they themselves do not heat up when in the state in which electrical current flows through them. The resistor layer 1, functioning in a temperature-dependent manner, and the electricl conductive connecting layers 3 are covered with a thin layer of glass 5, except for one contact section 6 at each of the ends, remote from the temperature-dependent resistor layer 1, of the electrical conductive connecting layers 3, which are overlapped by securing sections 7, bent at an angle in the form of claws, of respective electrical connections 8 and are joined thereto in an electrically conductive manner, for instance by soldering or welding. The electrical connections 8 are in alignment with one another and each rests with a respective support section 9, facing one another, on a respective end face 10 of the carrier 2. The electrical connections 8 may be embodied as separate parts and each joined to a holder body 12, for instance by soldering or welding, or in a manner not shown they may be part of a respective holder body 12, for instance gripping the contact sections 6 in a claw-like manner by means of a deformation of the holder body 12 and resting on the end faces 10 of the carrier 2, so that no thrusting forces are exerted upon the contact sections 6 via the securing sections 7.

Figure 2:
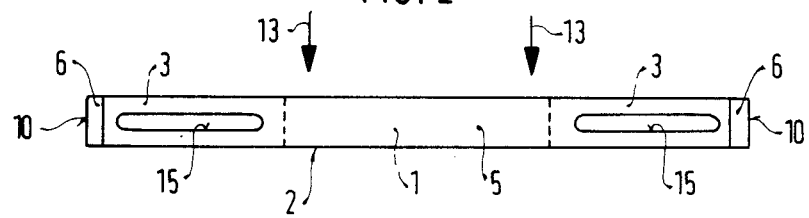
FIG. 2 is a plan view on a second exemplary embodiment of a device according to the invention.

As also shown in FIG. 2, the length of the temperature-dependent resistor layer 1 crosswise to the flow of the medium 13 is approximately half the sum of the lengths of the associated connecting layers 3, or less. Since the carrier 2, made of ceramic material, is a poor conductor of heat, heat is drawn off only to a limited extent via the relatively long areas of the carrier 2 carrying the connecting layers 3, as a result of which the speed of response of the device upon changes in the flow speed is increased. An increase in the speed of response of the device to changes in the mass of the flowing medium can also be attained by at least partially reducing the cross section of the carrier 2 and of each connecting layer 3 in the vicinity of the connecting layers 3 as compared with the cross section of the carrier 2 in the vicinity of the temperature-dependent resistor 1, for instance by means of recesses 15, so that again a reduced conduction of heat to the end faces 10 of the carrier 2 is brought about. The electrically conductive connections between the contact sections 6 and the securing sections 7 of the electrical connections 8 are located, in these embodiments, at the relatively cooler ends of the carrier 2, so that they are less vulnerable to corrosion and so that greater tolerances can be selected.

Figure 3:
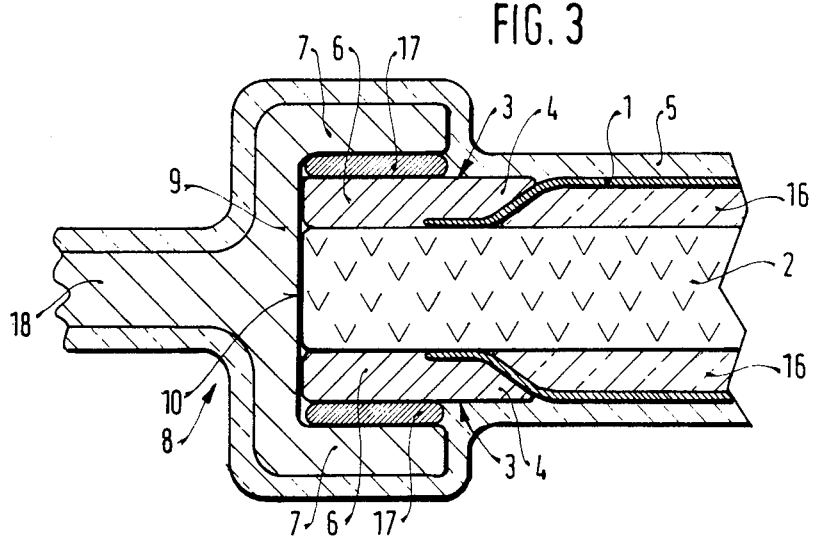
FIG. 3 is a fragmentary view of a third exemplary embodiment of a device according to the invention.

In the exemplary embodiment of a device according to the invention as shown in FIG. 3, elements having the same function as those in the previous exemplary embodiments are identified by the same reference numerals. In this third embodiment, a thin layer of glass 16 is again disposed between the carrier 2 and the temperature-dependent resistor layer 1, but deviating from the previous embodiments, this layer 16 is embodied as shorter, transversely to the flow direction of the medium, than the temperature-dependent resistor layer 1. The electrical conductive connecting layers 3 overlap the temperature-dependent resistors 1 at 4 and are joined in contact sections 6 to the claw-like securing sections 7 of the electrical connections 8 by soldering or welding 17. The temperature-dependent resistor layer 1, the connecting layers 3 and, at least in part, the electrical connections 8 can be covered by the common thin glass layer 5, which not only increases the resistance to corrosion but also effects a more uniform transmission of the temperature of the flowing medium to the temperature-dependent resistor layer 1. Each electrical connection 8 may have a holder rib 18, which is oriented toward a holder body 12, not shown, and joined thereto in an electrically conductive manner.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States:

1. A device for measuring the mass of a flowing medium comprising a rectangular carrier, at least one temperature-dependent resistor layer supported on at least one surface of said rectangular carrier along a middle portion thereof and electrically conductively joined to at least two electrical connectors, each of said electrical connectors contacts a respective end face of the carrier, connecting electrical conductive layers having low electrical resistance on opposite ends of said at least one carrier surface in electrical contact with opposing ends of the temperature-dependent resistor layer with an end portion of said electrical conductive layers overlapping adjacent ends of the temperature-dependent resistor layer supported on the carrier, and the remainder of said electrical conductive layers directly on said carrier surface, each of said connecting electrical layers including a contact end section oriented in the direction of said electrical connectors and in electrical contact therewith, and the temperature-dependent resistor and the connecting layers are covered with a thin layer of glass except for one contact section on the ends of each of the connecting layers remote from the temperature-dependent resistor layer, and the contact sections are overlapped by securing sections of said connectors bent at an angle in the form end grips, each comprising a respective electrical connection, and are joined to said electrical conductive layers in an electrically conductive manner in said contact section.

2. A device as defined by claim 1, in which the length of the temperature-dependent resistor layer is approximately half the length of, or less than half, the sum of the lengths of the associated electrical conductive connecting layers on opposite sides of the temperature-dependent resistor layer.

3. A device as defined by claim 2, in which the cross section of the carrier and of each connecting layer is reduced at least partially, in the vicinity of the connecting layers, as compared with the cross section of the carrier in the vicinity of the temperature-dependent resistor layer.

4. A device as defined by claim 1, in which a thin layer of glass is provided between the carrier and the temperature-dependent resistor layer, which layer is shorter in length than the temperature-dependent resistor layer.

5. A device as defined by claim 1, in which said layer of glass covering the temperature-dependent resistor layer and the connecting layers also covers the electrical connections, at least partially.

* * * * *